United States Patent [19]
Lee et al.

[11] Patent Number: 5,974,199
[45] Date of Patent: Oct. 26, 1999

[54] METHOD FOR SCANNING AND DETECTING MULTIPLE PHOTOGRAPHS AND REMOVING EDGE ARTIFACTS

[75] Inventors: Yongchun Lee; Quinton Lamar Sowell, both of Rochester, N.Y.

[73] Assignee: Eastman Kodak Company, Rochester, N.Y.

[21] Appl. No.: 08/831,272

[22] Filed: Mar. 31, 1997

[51] Int. Cl.$^6$ .................................................. G06K 9/32
[52] U.S. Cl. .......................................... 382/289; 382/296
[58] Field of Search .................................. 382/289, 296, 382/176

[56] References Cited

U.S. PATENT DOCUMENTS 5,430,808   7/1995   Baird et al. .............................. 382/176

Primary Examiner—Leo H. Boudreau
Assistant Examiner—Gregory Desire
Attorney, Agent, or Firm—Nelson Adrian Blish; David A. Novais

[57] ABSTRACT

A method for scanning and detecting number and skew angle of photographs (12) and removing edge artifacts is disclosed. A plurality of photograph is placed on a scanner (11). A low resolution scan (34) is conducted of the photographs (12) to produce a plurality of low resolution images. A plurality of polygons is constructed, wherein each polygon contains at least one low resolution image. A number of polygons is determined and compared to the number of photographs. If the number of polygons is less than the number of photographs, the photographs are repositioned to separate overlapped photographs and the low resolution is repeated. A skew angle and location is determined for each of the photographs. A first photograph is selected and the first photograph is scanned at a high resolution to produce a high resolution image. The high resolution image is deskewed and cropped to remove the edge artifacts.

12 Claims, 23 Drawing Sheets

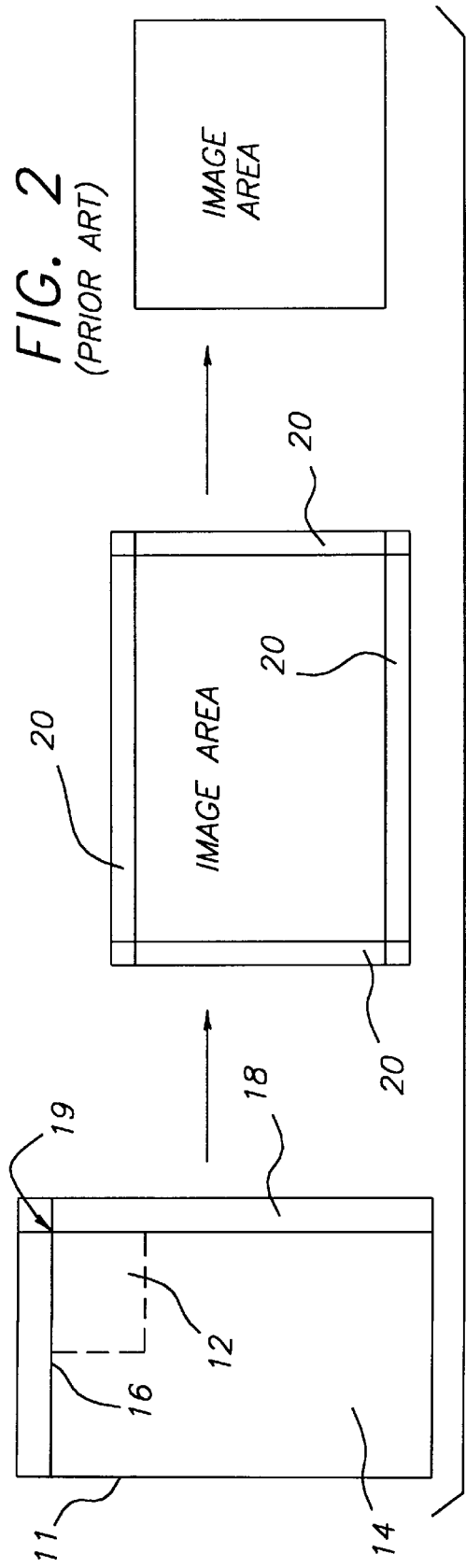
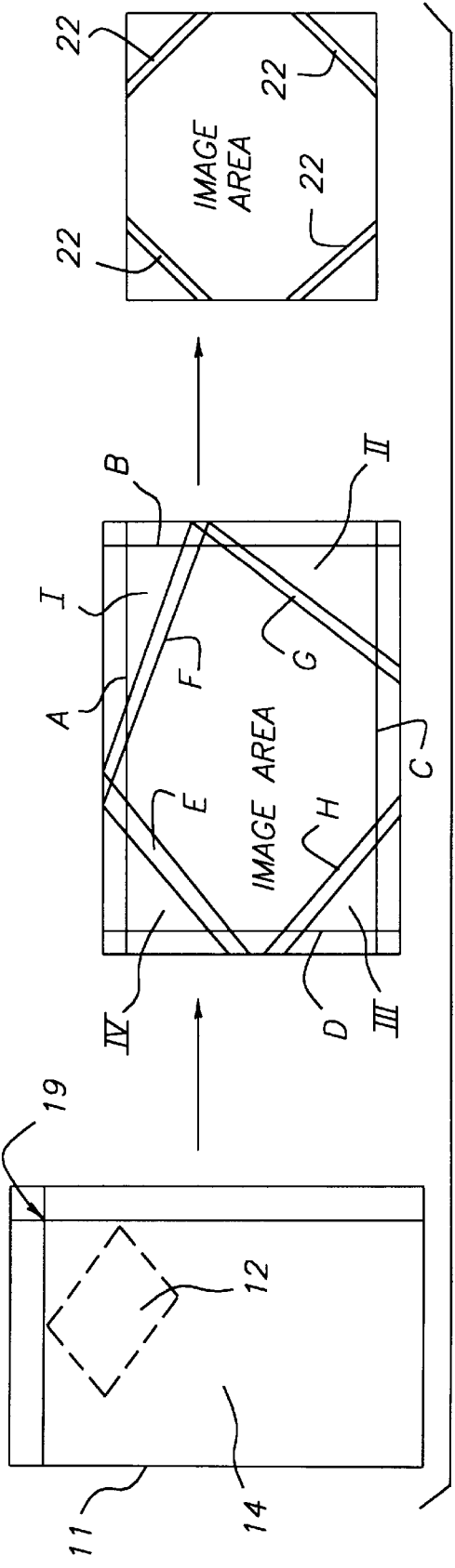

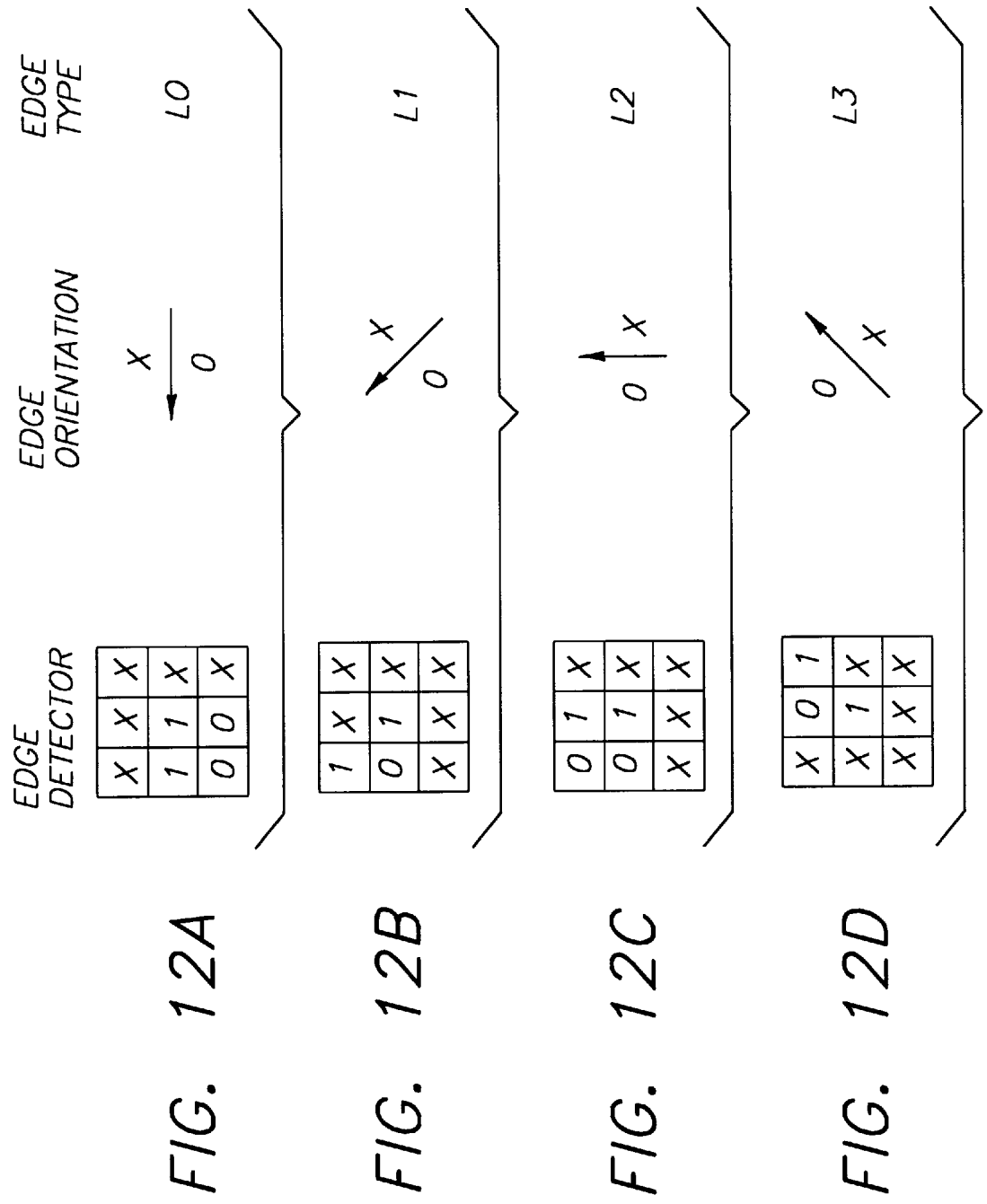

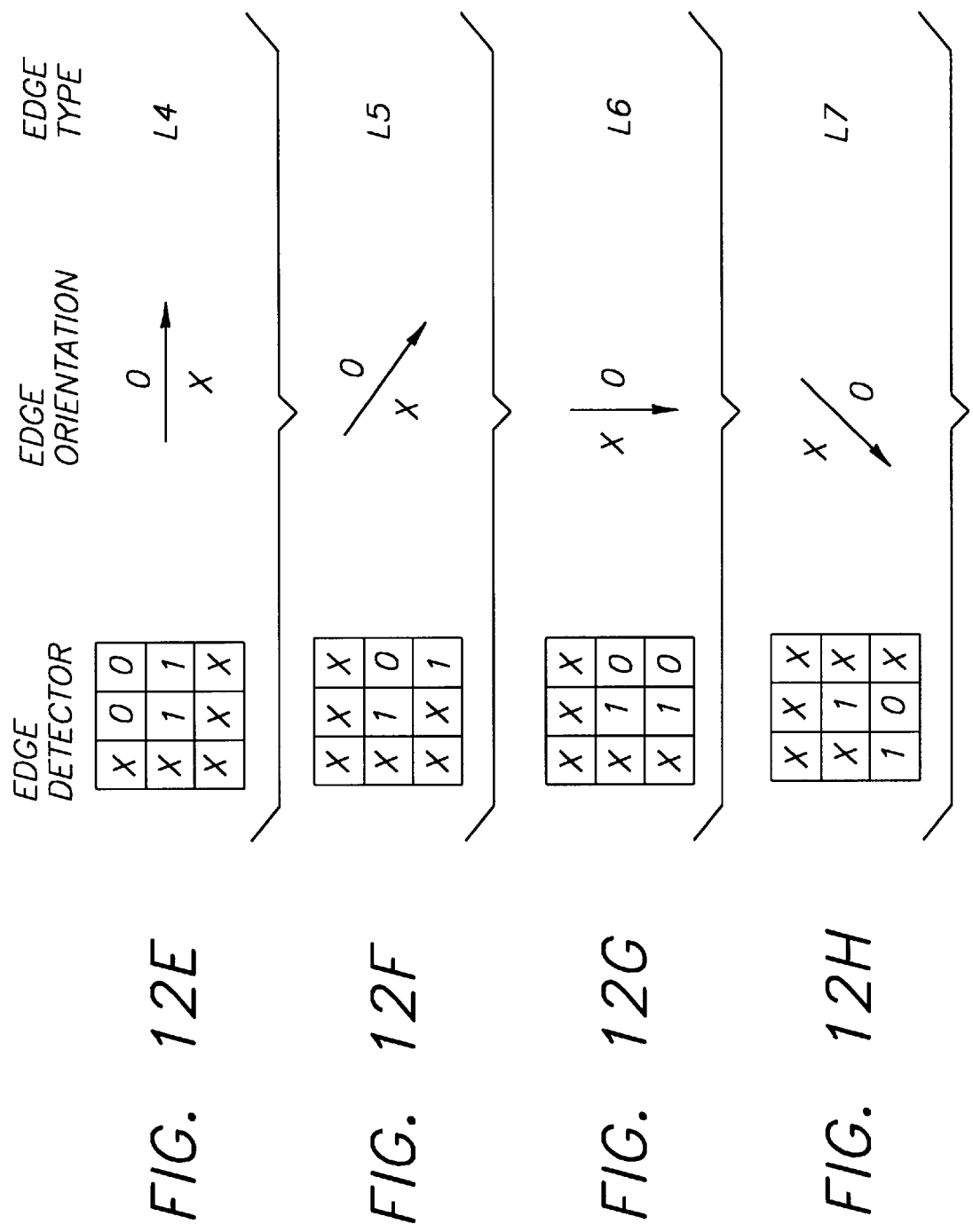

|   | EDGE DETECTOR | EDGE ORIENTATION | EDGE TYPE |
|---|---|---|---|
| FIG. 13E | x x x / x 1 1 / x 0 0 | x ↑ 0 | R4 |
| FIG. 13F | x x x / x 1 x / x 0 1 | x ↗ 0 | R5 |
| FIG. 13G | x x x / 0 1 x / 0 1 x | 0 → x | R6 |
| FIG. 13H | x x x / 0 1 x / 1 x x | 0 ↘ x | R7 |

| RULE # 1 | | |
|---|---|---|
| x | 0 | 1 |
| x | 1 | x |
| x | x | x |

(i=3)

| RULE # 2 | | |
|---|---|---|
| x | 0 | 1 |
| x | 1 | 0 |
| x | x | x |

(i=3)

| RULE # 3 | | |
|---|---|---|
| 1 | x | 1 |
| x | x | 0 |
| 0 | 0 | 0 |

(i=1, j=3)

| RULE # 4 | | |
|---|---|---|
| 0 | 0 | 1 |
| 1 | 1 | x |
| x | x | x |

| RULE # 5 | | |
|---|---|---|
| 1 | 0 | 1 |
| x | 1 | x |
| x | x | x |

| RULE # 6 | | |
|---|---|---|
| 0 | 0 | x |
| 0 | 1 | 1 |
| 1 | x | x |

(i=5, j=7)

| RULE # 7 | | |
|---|---|---|
| x | x | x |
| x | x | 1 |
| 1 | 0 | 1 |

| RULE # 8 | | |
|---|---|---|
| x | x | x |
| x | 1 | 1 |
| 1 | 0 | 0 |

FIG. 14

| GIVEN TEMPLATE | TABLE ENTRY | RULES APPLIED | THE RESULTING TEMPLATE COMMANDS |
|---|---|---|---|
| FIG. 15A | 373 | #2, #5, #7 | 1, 3, 6, 5, 3 |
| FIG. 15B | 124 | #4, #8 | 0, 3, 6, 5 |
| FIG. 15C | 151 | #2 | 2, 2 |
| FIG. 15D | 368 | #3, #5 | 0, 1, 3, 6, 3, 6 |

```
┌─────────────────────────────────┐
│        A POLYGON                │
│  (OUTLINE OF A PHOTOGRAPH)      │
└─────────────────────────────────┘
              │
              ▼
┌─────────────────────────────────────────────┐
│ COLLECT LEFT-MOST INTERSECTION POINTS AND   │
│ RIGHT-MOST INTERSECTION POINTS OF THE       │
│ POLYGON AND VERTICAL LINES FOR EVERY Dy     │
│ INCREMENT IN HORIZONTAL DIRECTION, AS       │
│ SHOWN IN FIG. 1A.                           │
└─────────────────────────────────────────────┘
              │
              ▼
┌─────────────────────────────────────────────┐
│ CALCULATE HORIZONTAL DISTANCE (Dx) OF EVERY │
│ PAIR OF ADJACENT INTERSECTION POINTS AND    │
│ REMOVE THE PAIR OF POINTS WHERE |Dy|<|Dx|   │
│ FROM THE TWO SETS OF POINTS, RESPECTIVELY.  │
└─────────────────────────────────────────────┘
              │
              ▼
┌─────────────────────────────────────────────┐
│ CALCULATE HISTOGRAMS Hl(Dx) AND Hr(Dx) FROM │
│ THE TWO SETS OF POINTS, RESPECTIVELY. Ml    │
│ AND Mr ARE THE MODES OF THE TWO HISTOGRAMS  │
│ AS SHOWN IN FIG. 1B.                        │
└─────────────────────────────────────────────┘
              │
              ▼
┌─────────────────────────────────────────────┐
│ REMOVE THE PAIR OF INTERSECTION POINTS      │
│ WHOSE Dx IS NOT CLOSE TO THE MODE OF THE    │
│ Hl(Dx) AND THE Hr(Dx), RESPECTIVELY. A      │
│ TYPICAL THRESHOLD VALUE OF Dx IS SET AT 2.  │
└─────────────────────────────────────────────┘
              │
              ▼
┌─────────────────────────────────────────────┐
│ CALCULATE THE TWO CORRELATION COEFFICIENTS  │
│ (Cl AND Cr) OF THE TWO SETS OF INTERSECTION │
│ POINTS, RESPECTIVELY. SET Cm=Cl, IF Cl>Cr.  │
│ OTHERWISE Cm=Cr.                            │
└─────────────────────────────────────────────┘
              │
              ▼
        ╱ Cm < TH? ╲  NO   ┌──────────────────┐
        ╲          ╱ ────▶ │ VERTICAL LEFT    │
              │            │ BORDER AND       │
             YES           │ VERTICAL RIGHT   │
              │            │ BORDER           │
              ▼            └──────────────────┘
┌─────────────────────────────────────────────┐
│ LEFT AND RIGHT STRAIGHT, SKEW BORDERS OF    │
│ THE PHOTOGRAPH ARE DETECTED. THE BORDER     │
│ LINE EQUATIONS ARE COMPUTED BY THE LEAST    │
│ SQUARE FIT OF THE REMAINING INTERSECTION    │
│ POINTS.                                     │
└─────────────────────────────────────────────┘
              │
              ▼
┌─────────────────────────────────────────────┐
│ STRAIGHT LINES OF LEFT BORDER AND RIGHT     │
│ BORDER OF THE PHOTOGRAPH.                   │
└─────────────────────────────────────────────┘
```

FIG. 23

METHOD FOR SCANNING AND DETECTING MULTIPLE PHOTOGRAPHS AND REMOVING EDGE ARTIFACTS

CROSS-REFERENCE TO RELATED APPLICATIONS

The present application is related to U.S. application Ser. No. 08/739,076, filed Oct. 28, 1996, titled "A Look-Up-Table Technique for Conversion of a Bitmap Image Into Polygon Representation," by Yongchun Lee; and U.S. patent application Ser. No. 08/738,206, filed Oct. 25, 1996, titled "Business Form Image Identification Using Projected Profiles of Graphical Line and Text Stringlines," by Yongchun Lee, now U.S. Pat. No. 5,841,905.

FIELD OF THE INVENTION

This invention relates generally to the field of scanning photographs and more particularly to detecting the number and skew angle of photographs on a scanner platen, and reorienting and cropping the digitized image to remove edge artifacts prior to printing.

DESCRIPTION OF THE PRIOR ART

As shown in FIG. 1, if a user 10 wishes to make a copy of a photograph 12 on scanner 11, she must first place the photograph 12 on a scanner platen 14, against both the top glide 16 and side scanner glide 18. Next the user 10 is required to select the appropriate photo size, i.e., 4×6, 5×7, etc., on input screen 21. There are additional screens for selecting sizes which pertain to the APS photo format. Prior to printing the image or saving it to a disk, a high resolution scan is performed of a fixed size from the origin 19 on the scanner. This method is used in a number of commercial products.

There are some problems with this mode of operation. First, the user is restricted to placing a single photo on the scanner, at the origin, with proper alignment. If the image is not placed exactly at the origin, the scanned area will not contain a complete image, and the digitized image will contain part of the platen of the scanner, sometimes referred to as an edge artifact 20, shown in FIG. 2, located along one or more of the edges. These artifacts must be eliminated from consumers prints. Some scanners have a embedded logic in the software to crop the scan area along the horizontal and vertical edges to remove the artifact. However, if the image is rotated, the software does not remove the artifacts 22 along the image lines, as shown in FIG. 3. Also, if the user wishes to scan several photographs and save the images to a disk, she currently has to work with one image at a time which is inefficient.

SUMMARY OF THE INVENTION

It is an object of the present invention to provide a method for scanning multiplephotographs, determining number, location and skew angle of the photographs, and cropping the image to remove edge artifacts.

According to one aspect of the present invention a plurality of photographs is placed on a scanner platen. A low resolution scan is conducted of the photographs to produce a plurality of low resolution images. A plurality of polygons is constructed, wherein each polygon contains at least one low resolution image. A number of polygons is determined and compared to the number of photographs. If the number of polygons is less than the number of photographs, the photographs are repositioned to separate overlapped photographs and the low resolution is repeated. A skew angle and location of each of the photographs is determined. A first photograph is selected and the first photograph is scanned at a high resolution to produce a high resolution image. The high resolution image is deskewed and cropped to remove edge artifacts.

An advantage of the present invention is that a plurality of photographs may be scanned without constraints as to location or orientation of each photograph on the scanner platen

BRIEF DESCRIPTION OF THE DRAWINGS

FIG. 2 is a block diagram of a prior art system showing edge artifacts.

FIG. 3 is a block diagram of a prior art system showing a skewed photograph, a scanned image, and resulting edge artifacts on the printed photograph.

FIGS. 12A–12H are definitions for eight left edge detectors wherein 0=white dot, 1=black dot and X=a don't care value;

FIGS. 13A–13H are definitions for eight right edge detectors wherein 0=white dot, 1=black dot and X=a don't care value;

FIG. 14 depicts, in 3×3 matrix form, the templates resulting from the edge combinations following the rules of Table 1;

FIGS. 15A–15D are examples of template commands generated by the rules of Table 1;

FIG. 23 is a flow diagram schematically depicting detection of left border and right border of a photograph;

To facilitate understanding, identical reference numerals have been used in the drawings, where possible, to designate like elements.

DETAILED DESCRIPTION OF THE INVENTION

Figure 1:
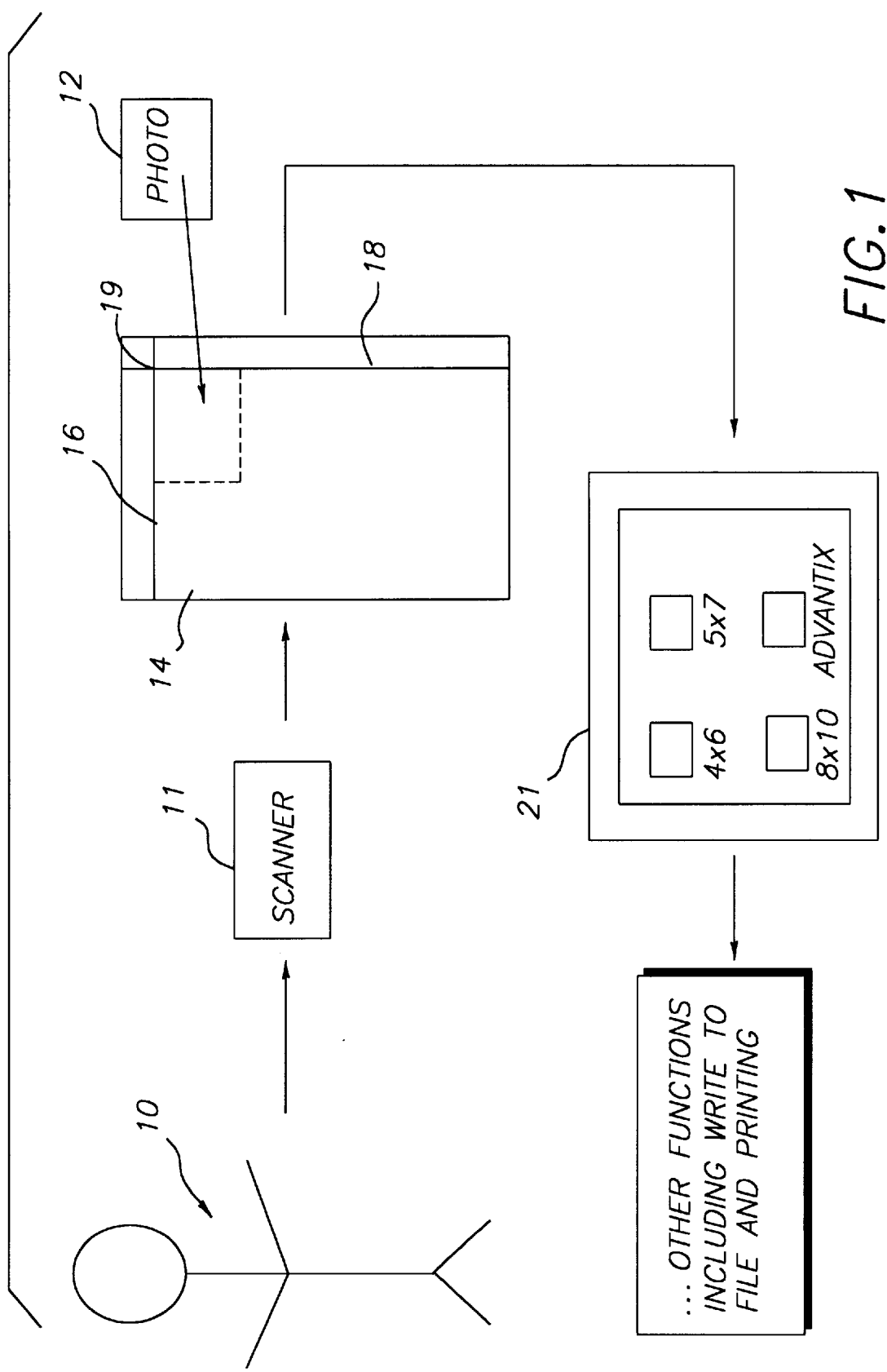
FIG. 1 is a block diagram of a prior art system for scanning photographs.
Figure 4:
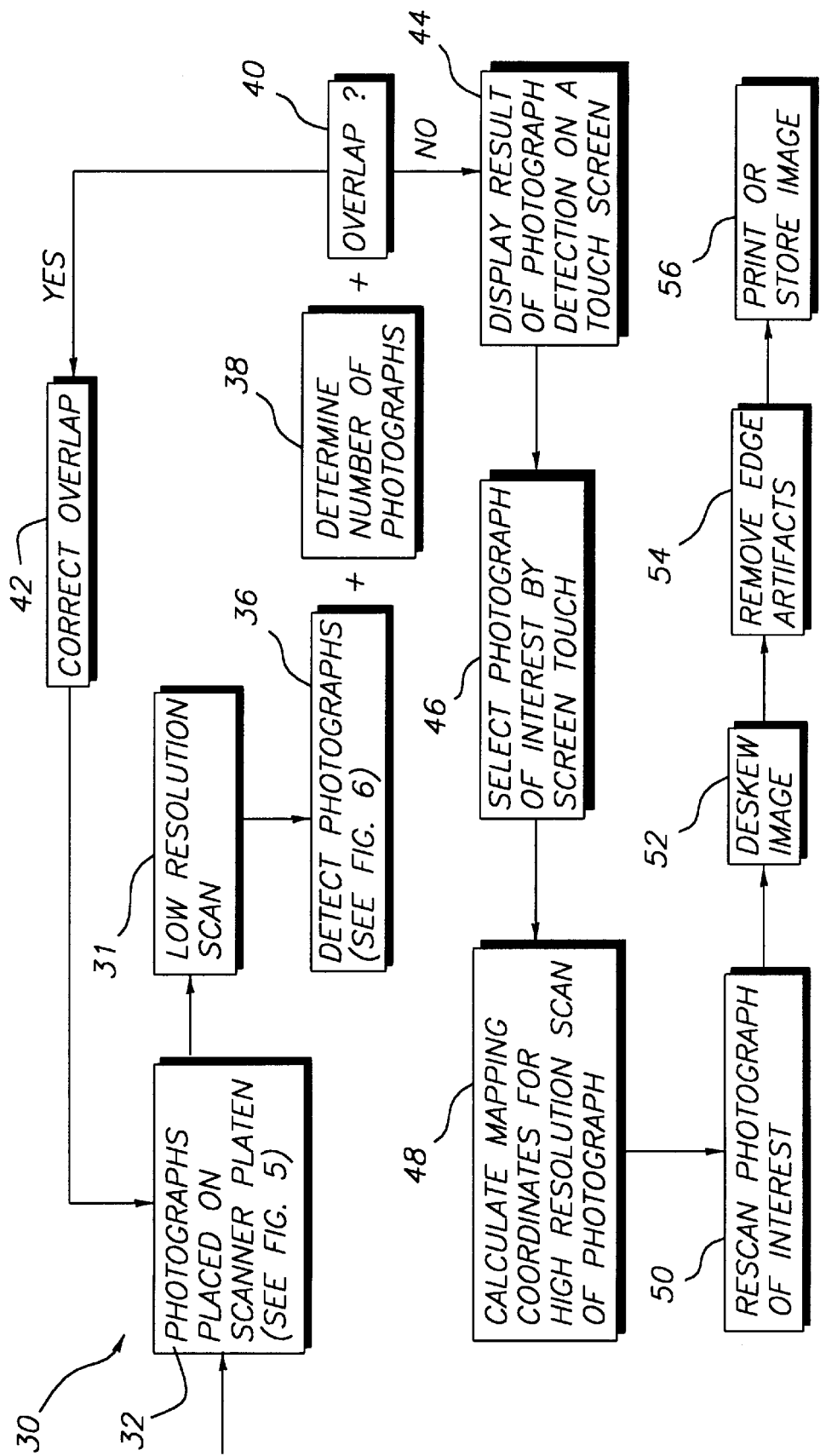
FIG. 4 is a block diagram of a system according to the present invention for automatically detecting a photograph location, correcting for size and skew angle, and removing artifacts.

Referring to FIG. 4, the major components and processing stages of a system for detecting and correcting skew angle of photographs, referred to in general by numeral 30, are shown in the form of a block diagram. The operations performed in each of the blocks is discussed in more detail below and with reference to subsequent figures.

A number of photographs to be scanned are placed on the platen of a scanner in block 32. A low resolution scan of the photographs is completed at 34 which detects the photographs at 36 and determines the number of photographs at 38. A determination is made for overlap of the photographs at 40. If the photographs are overlapped, the operator is notified to correct the overlap 42 and the photographs are repositioned. When it is determined that there are no overlaps, the result of the photograph detection is displayed on a touch screen at 44. The operator selects a photograph of interest by touching the screen at 46.

The mapping coordinates are calculated for the photograph of interest at 48 and the photograph of interest is rescanned at a higher resolution at 50. The digitized image is deskewed to at 52 and artifacts are removed at 54. The photograph is then printed or stored at 56.

Figure 5:
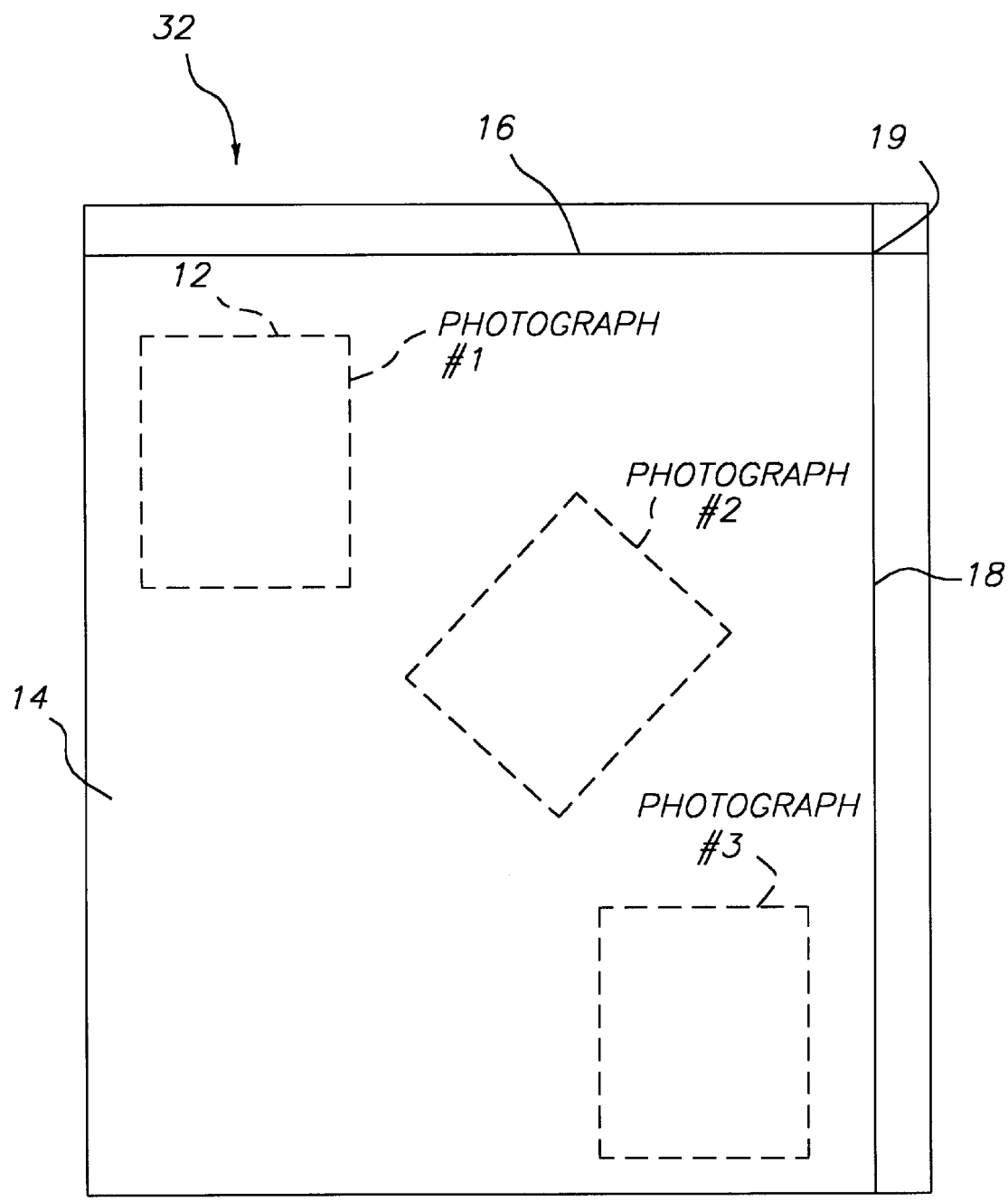
FIG. 5 is a schematic diagram of multiple photographs on a surface of a scanner platen.

FIG. 5 shows a group of photographs 12 which have been placed on a scanner platen 14 in a random fashion without regard to the scanner glides 16 and 18, or to the origin point 19 for the scan. A low resolution scan, for example at 90 DPI (dots per inch), is conducted over the entire surface of the scanner platen 14 which produces a low resolution gray scale image.

Figure 6:
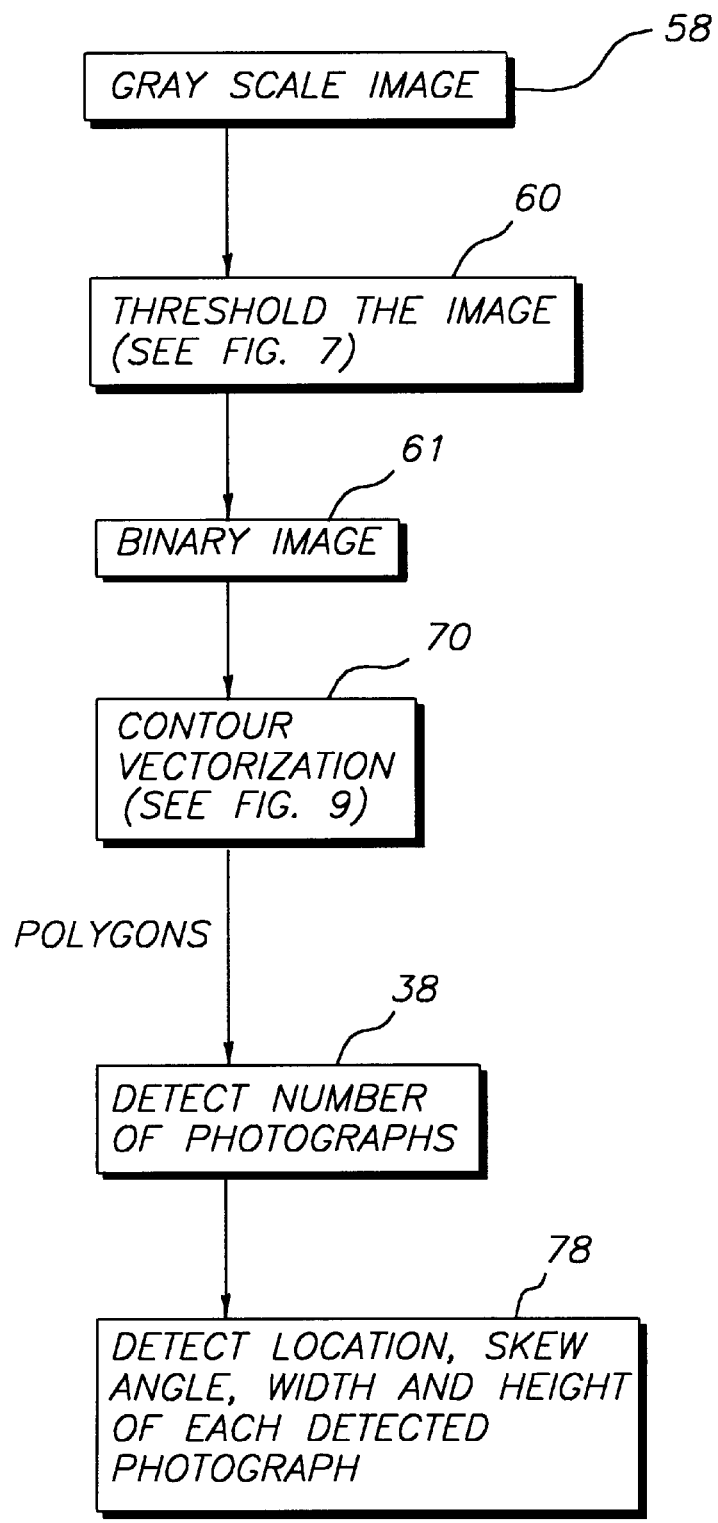
FIG. 6 is a block diagram of a system for detecting photographs.

The detection of the photographs is shown in more detail in FIG. 6. The low resolution gray scale image 58 is subjected to a threshold operation 60, discussed in more detail below, which results in a binary image 61. A contour vectorization process 70 is then conducted which detects the number of photographs 38. The location, skew angle, width, and height of each photograph is detected at 78.

Figure 7:
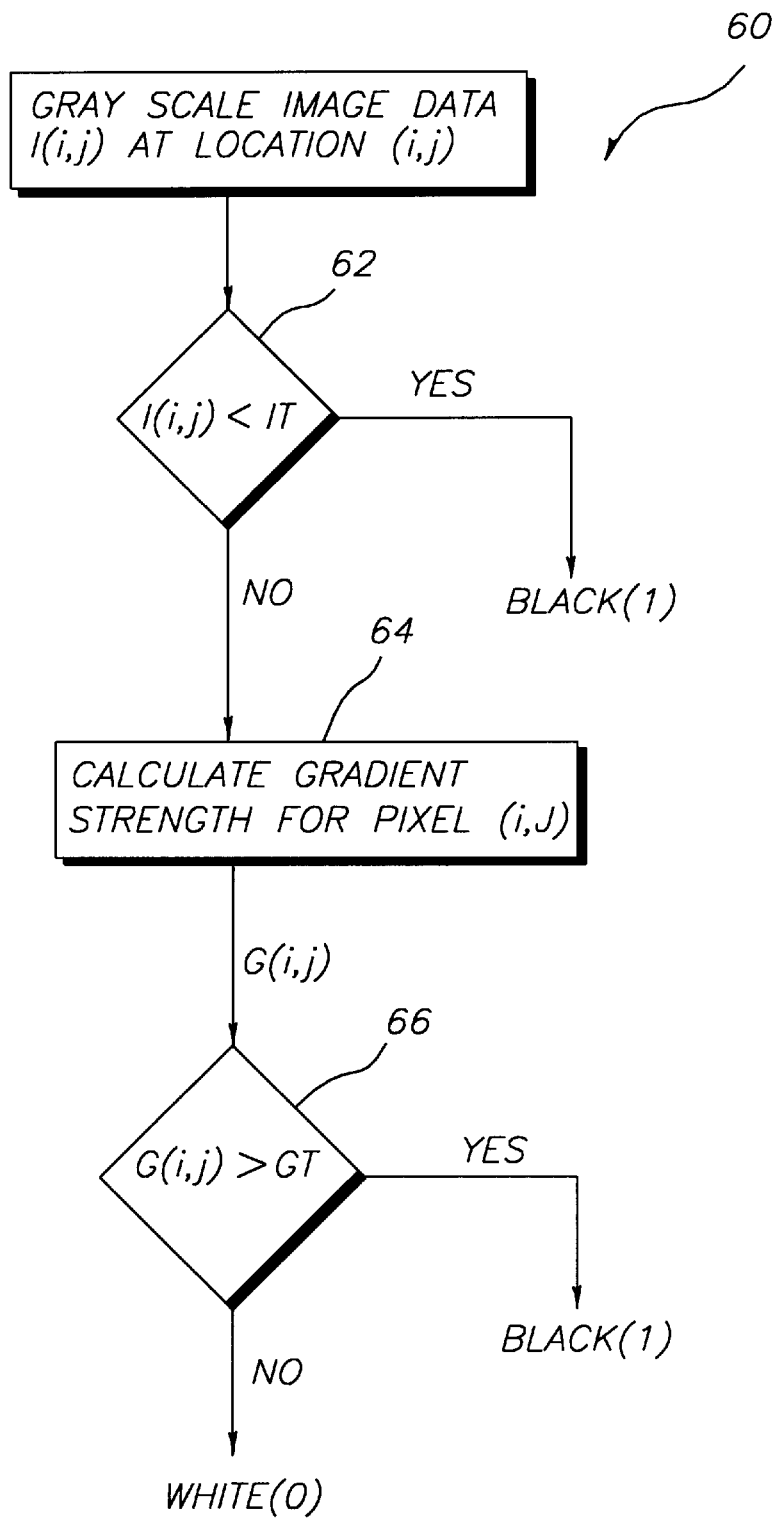
FIG. 7 is a block diagram of a system for thresholding an image.

The conversion from gray scale to binary image, called a thresholding process, is depicted in FIG. 7. In block 62 each pixel intensity is determined to be some value between 0–255. The intensity is then compared to a set value IT, for example 230. If the intensity is less than IT the pixel is interpreted as black.

If the intensity is greater than IT, a gradient strength for the pixel is calculated at block 64. Gradient strength for pixel (i,j) is determined by use of the so-called "Sobel" gradient operator on a window of pixels centered about pixel (i, j). See FIG. 8. Matrix 80, is a 3-by-3 window centered about pixel (i,j). As collectively defined in equations (1)–(3) below, the Sobel operator relies on computing horizontal and vertical pixel intensity gradients, GX (i,j) and GY (i,j), respectively, and for each pixel position (i,j) and GY (i,j), respectively, and for each pixel position (i,j) forming the gradient strength, G (i,j) as an absolute sum of GX (i,j) and GY (i,j):

$$GX(i, j) = L(i+1, j-1) + 2L(I+1, j) + \\ L(i+1, j+1) - L(i-1, j-1) - 2L(i-1, j) - L(i-1, j+1) \quad (1)$$

$$GY(i, j) = L(i-1, j+1) + 2L(i, j+1) + \\ L(i+1, j+1) - L(I-1, j-1) - 2L(i, j-1) - L(i+1, j-1) \quad (2)$$

$$G(i, j) = |GX(i, j)| + |GY(i, j)| \quad (3)$$

where: G(i,j) is the gradient strength at pixel position (i j). Referring again to FIG. 7, the value G(i,j) is compared to a constant GT, for example 50 at block 66. If the value of GT is greater than GT, the pixel is interpreted as black. This process is completed for each pixel.

Figure 9:
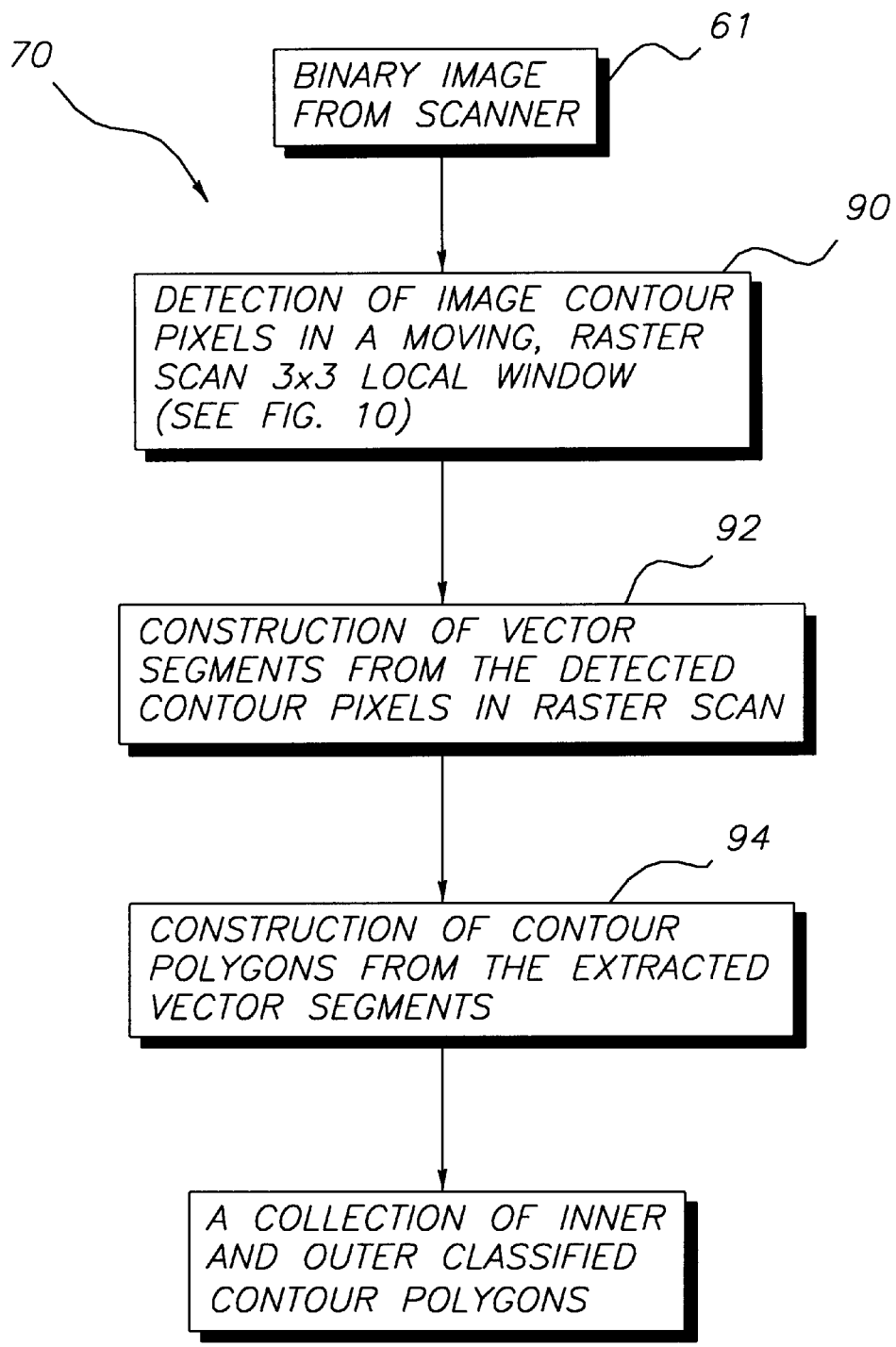
FIG. 9 is a flow diagram of contour polygon extraction.

The contour vectorization process 70 is described in more detail, with reference to FIG. 9. The binary image 61 is processed to detect contour pixels, and to assign pixel values according to established conversion values. The assignment function, represented by the block labeled 90, is implemented using a 3×3 pixel window that is advanced over the binary image one pixel column at a time. The pixels that represent the contours of the image are converted to vectors, represented by block 92. The vector segments are forwarded as the input to box 94. Box 94 represents the function of properly connecting vectors, end-to-end, to form one or more polygons representing the contours of the scanned image. In summary, the aforementioned operation, contour vectorization, converts a binary image into a collection of simple polygons which are useful in a photographic recognition system or technique such as skew detection, line detection, or image registration techniques.

Figure 10:
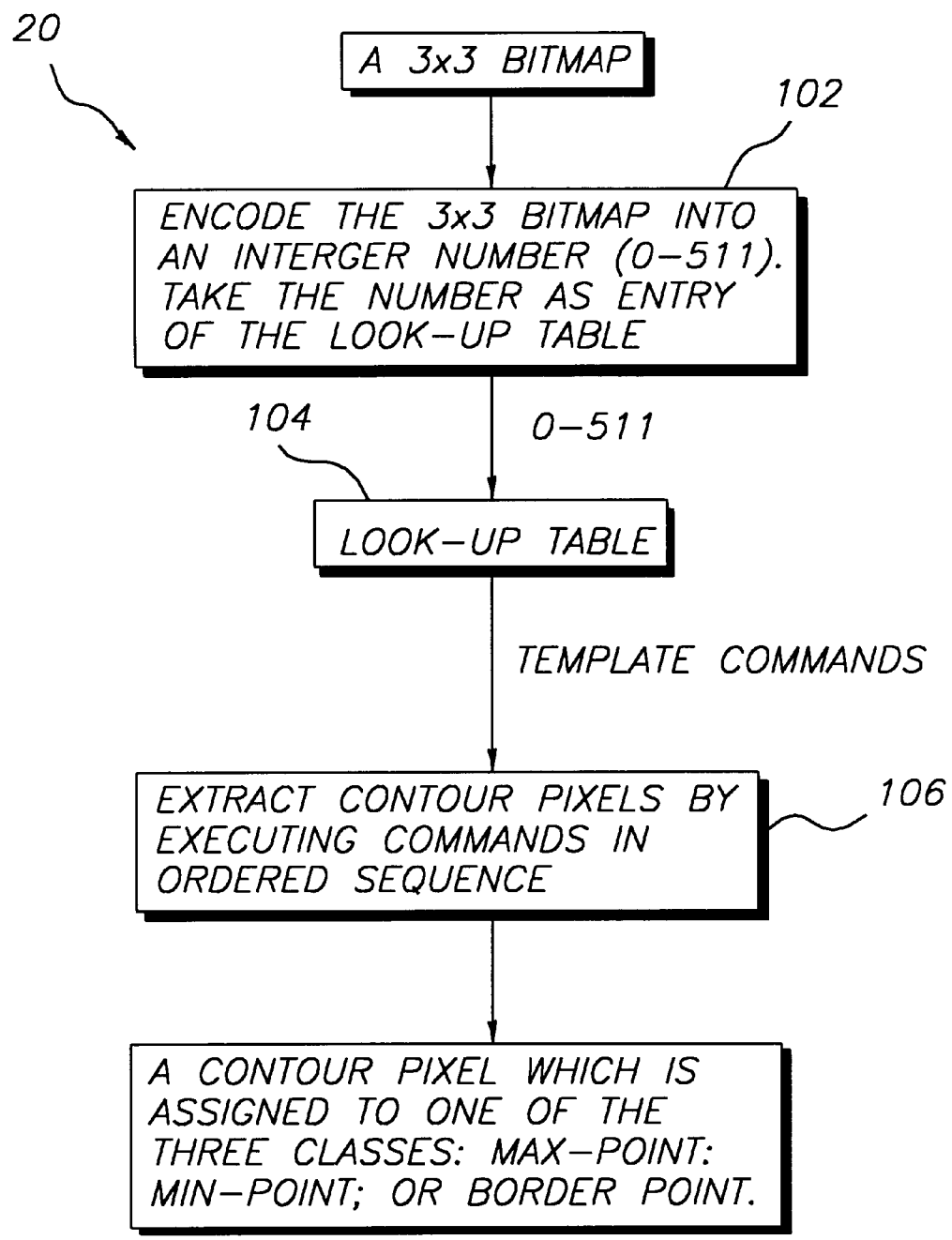
FIG. 10 is a flow diagram of a contour pixel detection method used in the preferred method of the invention.

Referring to FIG. 10 the functions performed by contour pixel detection block 90 of FIG. 9 is illustrated in more detail. The preferred methodology for detecting a contour pixel inputs a 3×3 bitmap taken from a scan of the photograph with the output of the scan function being the binary image 61 discussed previously. The 3×3 bitmap represents the nine pixel values that lie within a 3×3 window at one instant in time as the window is scanned over a photograph. As represented by the function box 102, each 3×3 bitmap is encoded into an integer number having values that range from 0–511. The resulting integer numbers are used as entries into a look-up-table 104. The look-up-table technique is preferred in that it is computationally efficient. The look-up-table outputs "template commands," the details of which will be described later, that are inputted to a function box 106, which represents the function of extracting contour pixels by executing template commands in an ordered sequence. Each of the outputted contour pixels is assigned to one of three classes: a max-point, a min-point, or a border point.

Figures 11A, 11B, 11C:
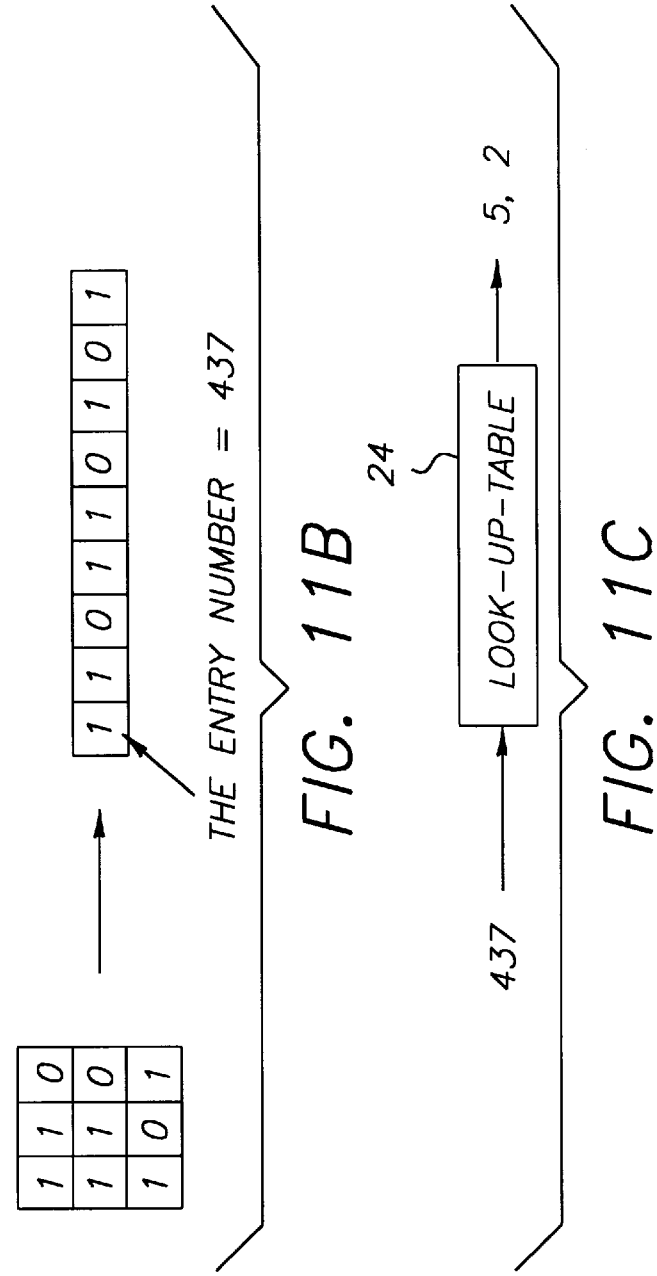
FIGS. 11A, 11B, and 11C, are diagrams illustrating examples of; the generation of a look-up-table from a 3×3 bitmap pattern, a conversion of a 3×3 bitmap to an entry of the look-up-table, and the generation of commands using the look-up-table, respectively.
Figures 13A, 13B, 13C, 13D:
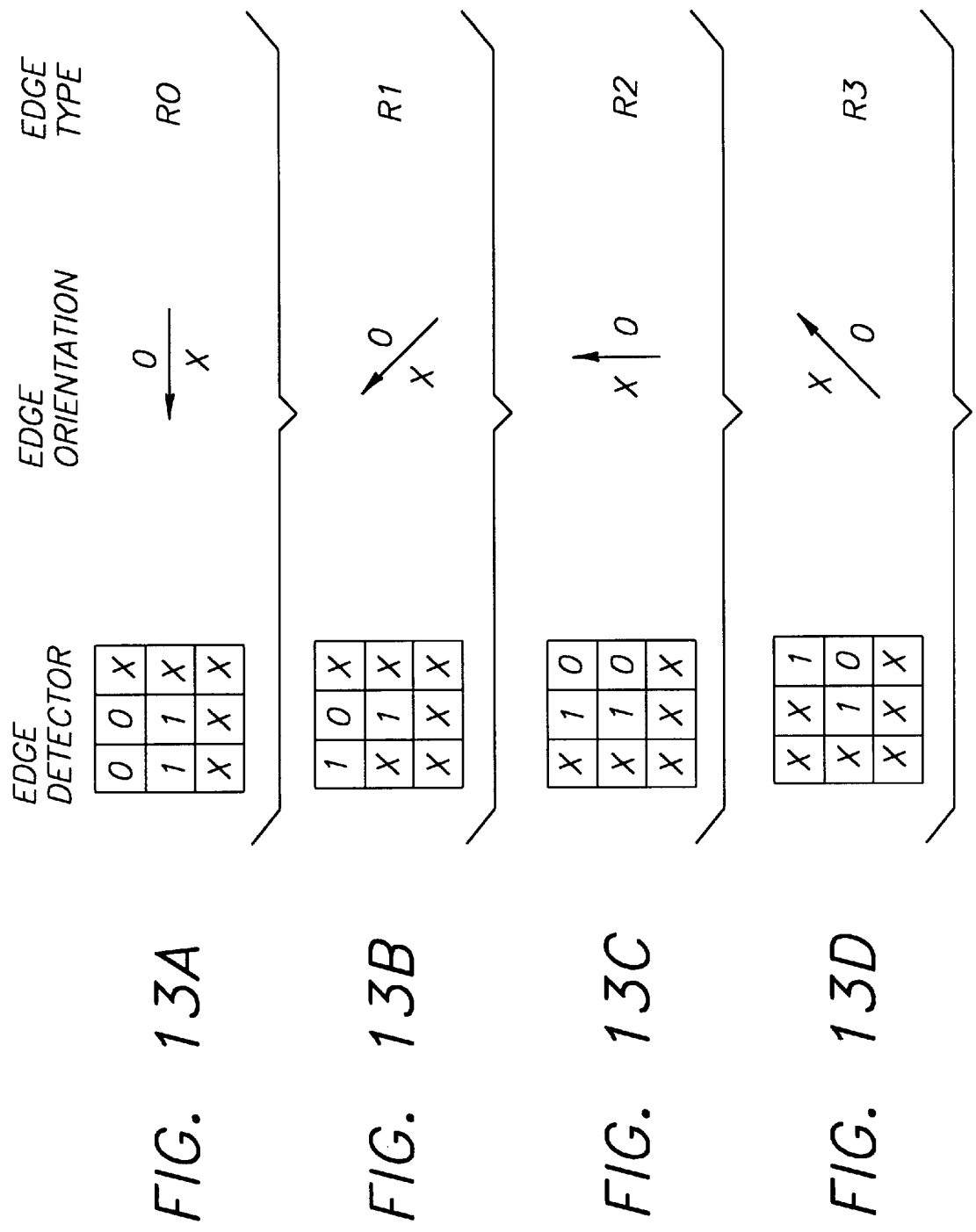

The details of the invention with respect to the formation of the output template commands from the 3×3 bit map will now be addressed in the discussion of FIGS. 11A–11C. In FIG. 11A, the 3×3 window is shown generically with its nine cells labeled A through I. As can be appreciated, in a binary system a bit within a cell can take on a value of either a 1 or a 0. This is illustrated with the specific example presented in FIG. 11B. The bits A through I are arranged in a specific order so as to form a 9-bit integer. As previously discussed in the preferred embodiment of the invention, the 9-bit integers range in value between 0 and 511. This integer is then used as an entry number to address the look-up-table 104, as shown in FIG. 11C, to output the associated template commands.

Referring now to FIGS. 12A through 12H, wherein the definitions used for eight left edge detectors is set forth defining edge types L0 through L7. In these figures a 0 represents a white dot, a 1 represents a black dot, and an X represents a dot that can be either white or black, but the system doesn't care. Examining the 3×3 matrix of FIG. 12A it is noted that two adjacent 1 bits are horizontal and parallel to two adjacent 0 bits. The edge orientation, represented by this bit pattern, is defined as being both horizontal and extending to the left. For ease of understanding, the edge orientations are represented by an arrow with the position of the 0 bit (white dots) controlling the directions of the edge orientation arrows. Note for edge type L0 that edge type L4 is the same, but flipped, in that the arrow is horizontal, but in the opposite direction, and that the 0 bits in the FIG. 12A window are below the 1's while in the FIG. 12E window the 0 bits are above the 1's. Note the same holds true for the vertical edge types L2 and L6 and for the 45 degree edge types L1, L5, L3, and L7. FIGS. 13A through 13H set forth the definitions for eight right edge detectors representing edge types R0 through R7.

Table 1 sets forth the template commands that are used for each edge type combination and assigns to each combination a rule number. Conversely stated, each rule number identifies a specific type of combination.

TABLE 1

| Rule | Basic Edge Type Combination | Corresponding Template Commands |
| --- | --- | --- |
| #1 | Li or Ri (i = 0, 1, 2, 3) | i (add a chain code command) |
| #2 | Li and Ri (i = 0, 1, 2, 3) | i, i (add two identical chain code commands) |
| #3 | Li and Rj (i < 4, j < 4) | i, j, 6 (commands to remove an outer contour min-point) |
| #4 | Li and Pj (i = 0, j = 3) | 0, 3, 6 (commands to remove an inner contour min-point) |
| #5 | Li and Rj (i = 1, j = 3) | 1, 3, 6 (commands to remove an inner contour min-point) |
| #6 | Li and Rj (i > 4, j > 4, j > i) | 4 (command to add a new outer contour max-point) |
| #7 | Li and Rj (i = 7, j = 5) | 5 (command to add a new inner contour max-point) |
| #8 | Li and Rj (i = 7, j = 4) | 5 (command to add a new inner contour max-point) |

FIG. 14 illustrates the templates that result from the edge combinations according to the rules of Table 1.

Table 2 illustrates the relationship between a particular 3×3 bitmap and its associated entry number. The entry number being generated according to the procedure previously illustrated in FIG. 13B. Table 2 also shows the template commands that are outputted from the look-up-table 24 when the corresponding entry number is applied as an address to the look-up-table. A number of bitmap patterns can have no template command assigned while others may have more than one. For example, referring to Table 2, if the center cell of the 3×3 matrix is 1 and at least one of the surrounding cells is a zero, there is a template command assigned, otherwise, no command is assigned.

TABLE 2

| 3 × 3 Bitmap Pattern | Entry Number | Template Command |
| --- | --- | --- |
| 000 000 000 | 0 | none |

TABLE 2-continued

| 3 × 3 Bitmap Pattern | Entry Number | Template Command |
| --- | --- | --- |
| 000 000 001 | 1 | none |
| . . . | . | . |
| 000 010 101 | 21 | 4, 5 |
| . . . | . | . |
| 000 010 111 | 23 | 4 |
| . . . | . | . |
| 101 110 000 | 368 | 0, 1, 3, 6, 3, 6 |
| . . . | . | . |
| 110 110 101 | 437 | 5, 2 |
| . . . | . | . |
| 111 111 111 | 511 | none |

The templates of FIGS. 15A–15D represent four bit patterns that translate into the table entry numbers, 373, 124, 151, and 368, using the methodology of bit assignment taught in FIGS. 11A and 11B. Each template pattern is then compared against the eight rules of combination for left and right edge detectors to determine which template command (s) apply to the template pattern.

| DEFINITIONS OF TEMPLATE COMMANDS | |
| --- | --- |
| 0 | add chain code 0 |
| 1 | add chain code 1 |
| 2 | add chain code 2 |
| 3 | add chain code 3 |
| 4 | initiate a new outer maximum contour point |
| 5 | initiate a new inner maximum contour point |
| 6 | merge two chain codes |

For example, the template of FIG. 15A includes three contor segments A, B, and C, that are represented by rule numbers 2, 5, and 7. Following these represented rules will result in template commands 1, 3, 6, 5 and 3. The template command 1 is related to contour segment A by noting that the center cell value 1 is accompanied by a 1 value in left uppermost cell. Comparing that relationship to the definition of chain code direction, illustrated by arrows in FIG. 16A, results in command 1. Likewise the 1 bits in the center cell and in the right uppermost cell results in command 3. An examination of the 1 pattern in the matrix of FIG. 15A results in the determination that the 1's in the upper two rows of the matrix represent a merging of the 1 and 3 chain codes. Such a merging results in the command 6. Examination of the third row of cell values indicates a new inner maximum contour point corresponding to contour segment C, which results in command 5. Examination of the right column of cell values results in the identification of contour segment B. Starting from the center cell value of 1 it is deduced that the associated chain code is a 3.

Figure 16A:
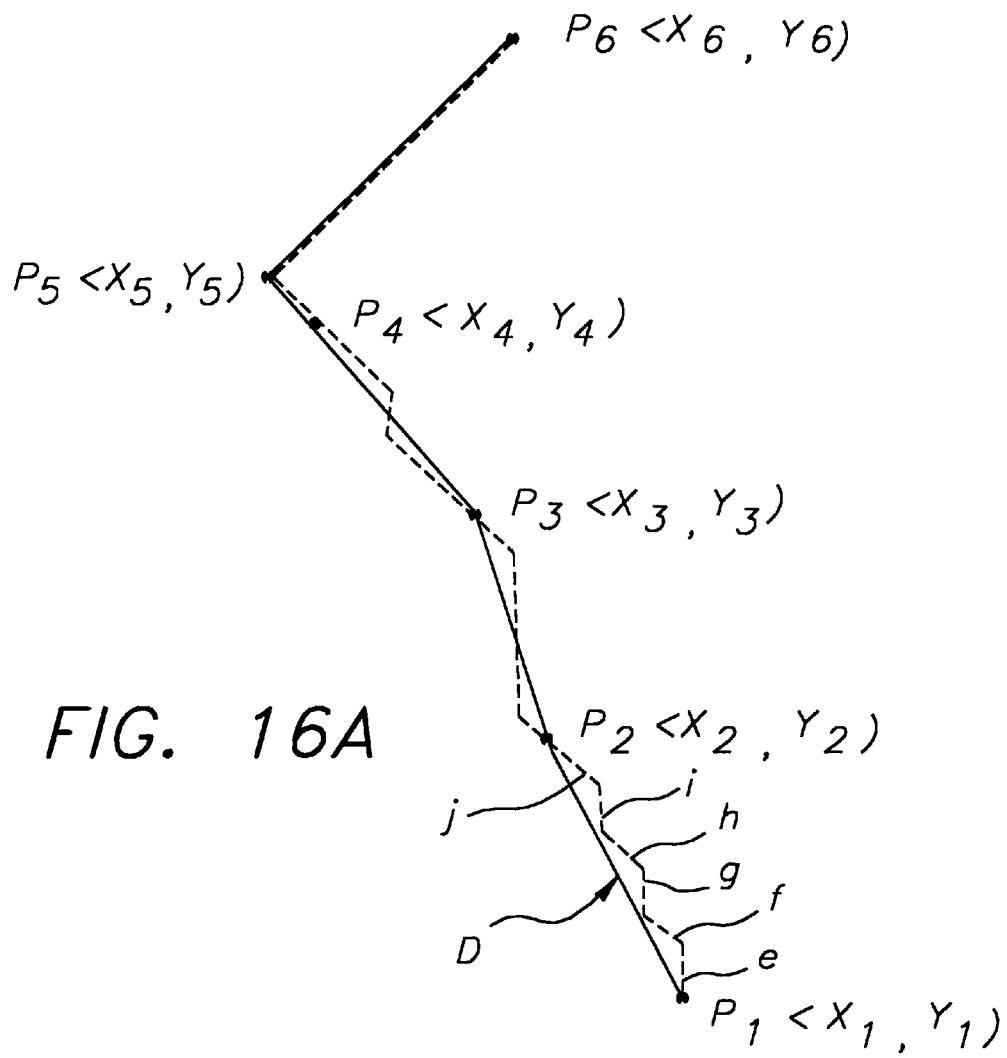
FIGS. 16A and 16B illustrate a directional chain code graph and an example of a conversion of chain codes into a representative polygon vectors, respectively.
Figure 16B:
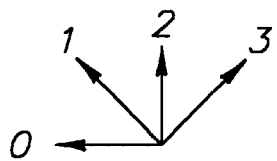

Each binary image that has been scanned has a number of its pixels forming edges and/or lines that are assigned to an edge type (L0–L7; R0–R7). This identifier is related to the direction of a vector segment. Following a rule set, each vector segment is joined to another vector segment either in a clockwise direction or in a counterclockwise direction, dependent on whether the vector segments make up the inner edge of an object or the outer edge of the object. An example of a chain code string represented by joined vector segments is illustrated in FIG. 16A. The represented chain code string is 212121 122221 112111211 1 33333. Comparing the chain code to the vectors illustrated in FIG. 16B and referencing the direction arrows of FIG. 16A, it is seen that the first digit 2 of the chain code results in a vertical vector element e joined to a vector element f representing the second digit 1 of the chain code going in the 45 degree direction indicated by the vector 1 of FIG. 16A. The same explanation applies to the vector elements g through j. At this point a line segment D is formed by a straight line between the two end points of the connected vector elements.

The next step is to determine the number of photographs detected, as shown in block 38 of FIG. 6. After contour vectorization, every outline of objects in the binary image is traced and represented by a polygon. Each vector is represented by the x and y coordinates of its end points, according to the process described in the previous section. The bounding coordinates, width, and height of every polygon (object outline), are calculated using the coordinates of the vertices (end points of vectors) of the polygon. The identification of a photographic polygon is made simply by grouping the polygons. The largest polygon of the overlapped polygons (smaller polygons completely contained within the larger polygons) is then labeled and identified as a candidate for a photograph. Comparing the size of the polygonal candidates, the largest M polygonal candidates are considered as the outer most outlines of photographs of interest, where the P is the expected number of photographs in a scan, and supplied by the user. If the detected number of photographs M is less than the number of photographs P entered by the user, then some of the photographs are overlapped on the scanner and the photographs must be repositioned. Every polygon identified as a photographic is subjected to further analysis for calculation of skew angle and location.

Figure 17:
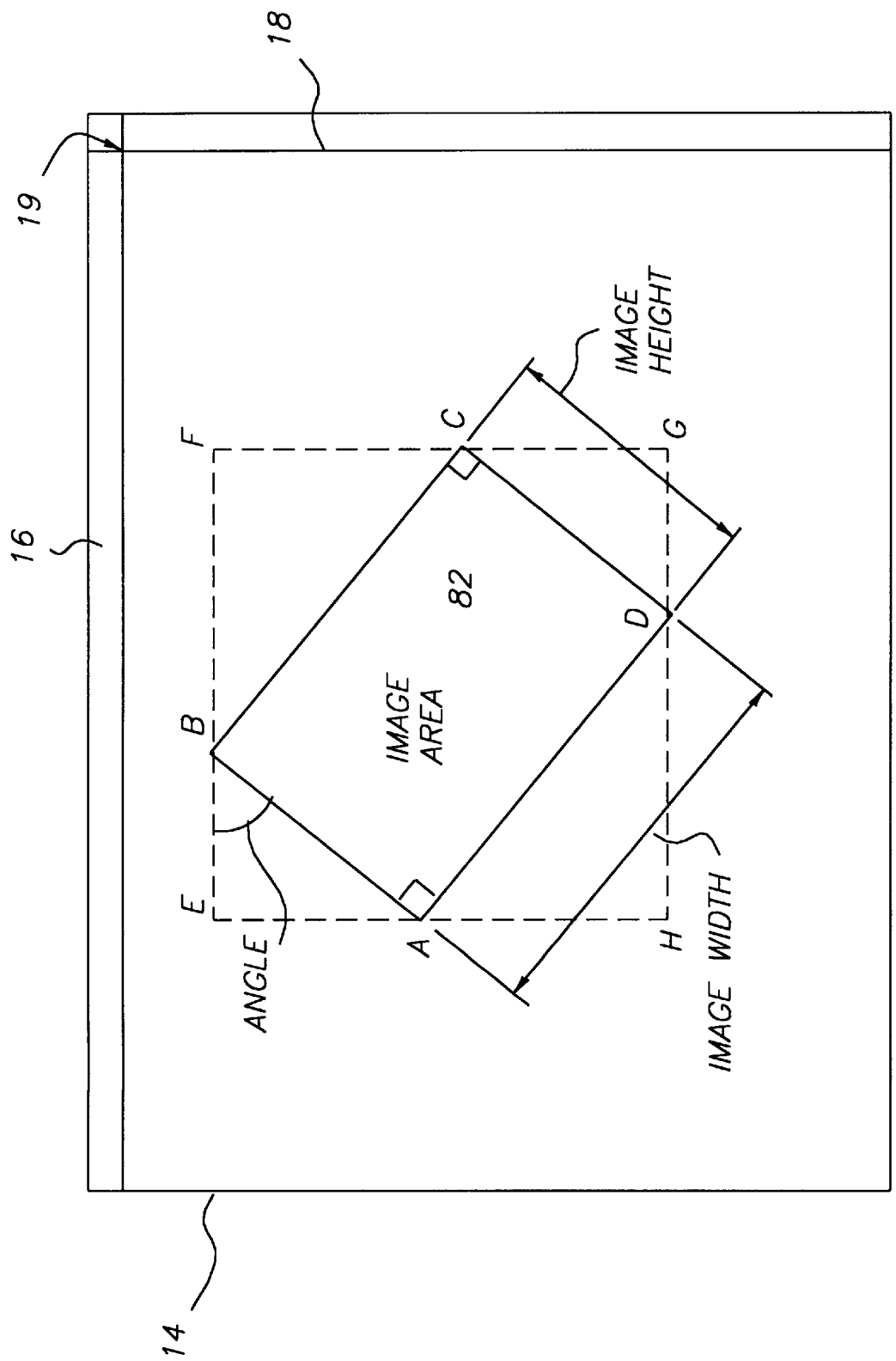
FIG. 17 is a schematic view of a skewed photograph on a scanner platen.

Referring back to FIG. 6, block 78 shows detection of location, skew angle, width, and height of each photographs. FIG. 17 shows schematically an image area 82 corresponding to a photograph detected on the scanner platen 14.

Figure 18:
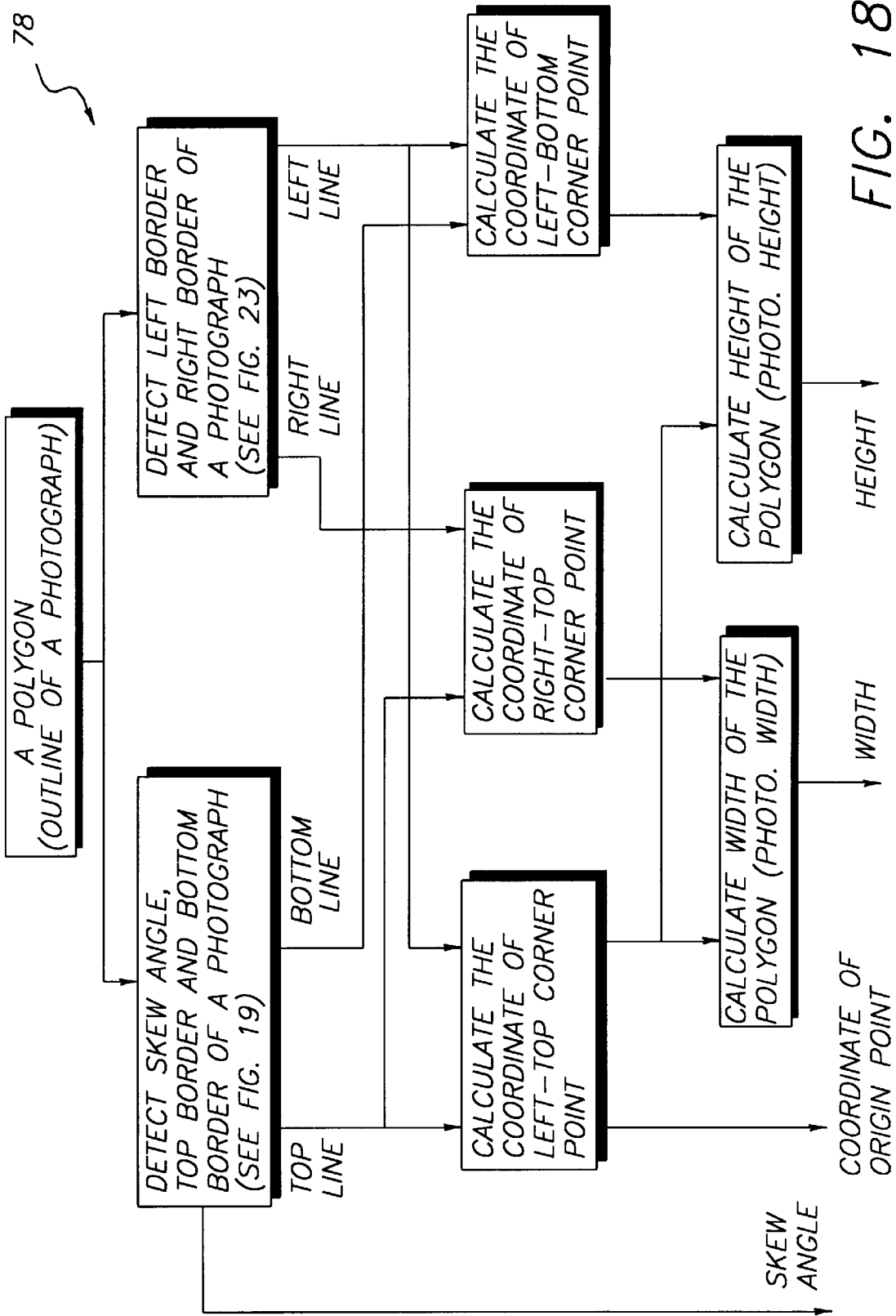
FIG. 18 is a diagram for calculating a location size and skew angle of a photograph.
Figure 19:
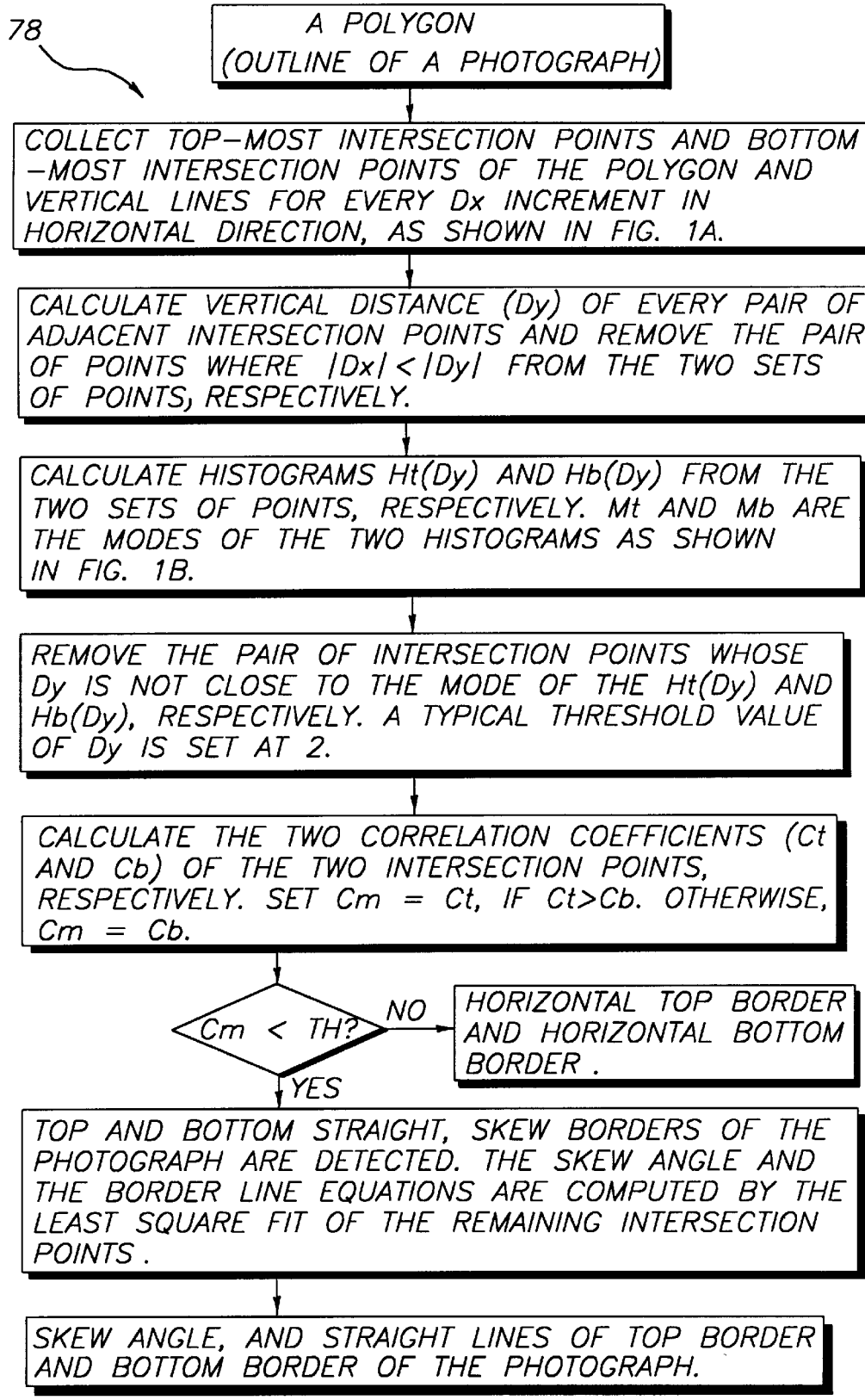
FIG. 19 is a diagram for detection of skew angle, top border, and bottom border of a photograph.

FIG. 18 shows a block diagram for calculating photographic dimension and skew angle of each polygon. In the block diagram, a rectangular photograph is assumed. The block diagram starts with a polygon. By processing the polygon 90, shown in more detail in FIG. 20, a top border line 92 and a bottom border line 93 are detected, and the slope of top border line is taken as the skew angle of the photograph. The left border line 94 and the right border line 95 of the polygon are also detected. The extracted four straight border lines are used to construct a rectangular shape equivalent to the photograph selected. The left-top corner point 96 which is defined as the origin of the photograph is calculated by locating an intersection of the top border line 92 and the left border line 94. The right-top corner point 97 is calculated by locating an intersection of the top border line 92 and the right border line 95. The left-bottom corner point 98 is then calculated by locating an intersection of the left border line 94 and the bottom border line 93. A width of the photograph is the distance between the left-top corner point 96 and the right-top corner point 97, and a height of the photograph is the distance between the left-top corner point 96 and the left-bottom corner point 98. The calculation of the top border line and the bottom border line is described in FIG. 19, and the calculation of the left border and the right border lines is described in FIG. 23.

Figures 8, 20:
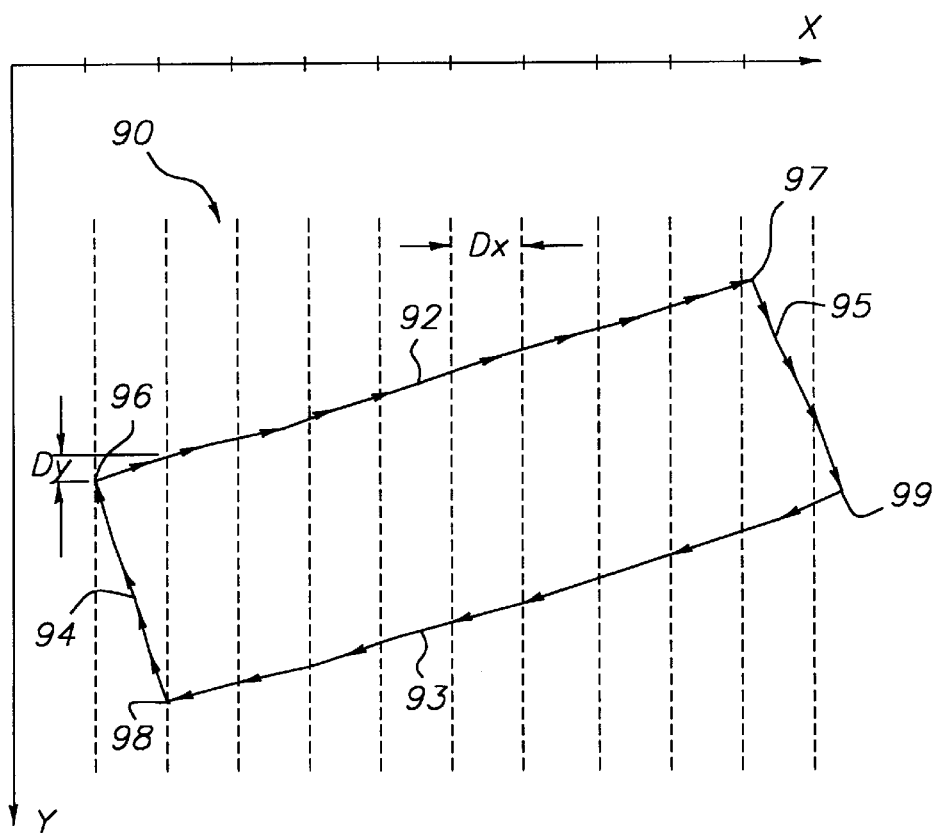
FIG. 8 is a table for calculating gradient strength.
FIG. 20 is a diagram showing collection of top most intersection points and bottom most intersection points.

FIG. 20 shows an example of a photographic polygon skewed at an unknown skew angle. A series of equally spaced vertical lines are constructed, separated by a distance Dx. The points at which vertical lines intersect polygon 90 are determined. The points with the minimum and maximum values of Y are recorded. The pair of adjacent points that meet the requirement that their length (Dy) in the vertical direction is greater than their length (Dx) in the horizontal direction are deleted from the two sets of points, respectively.

Figure 21:
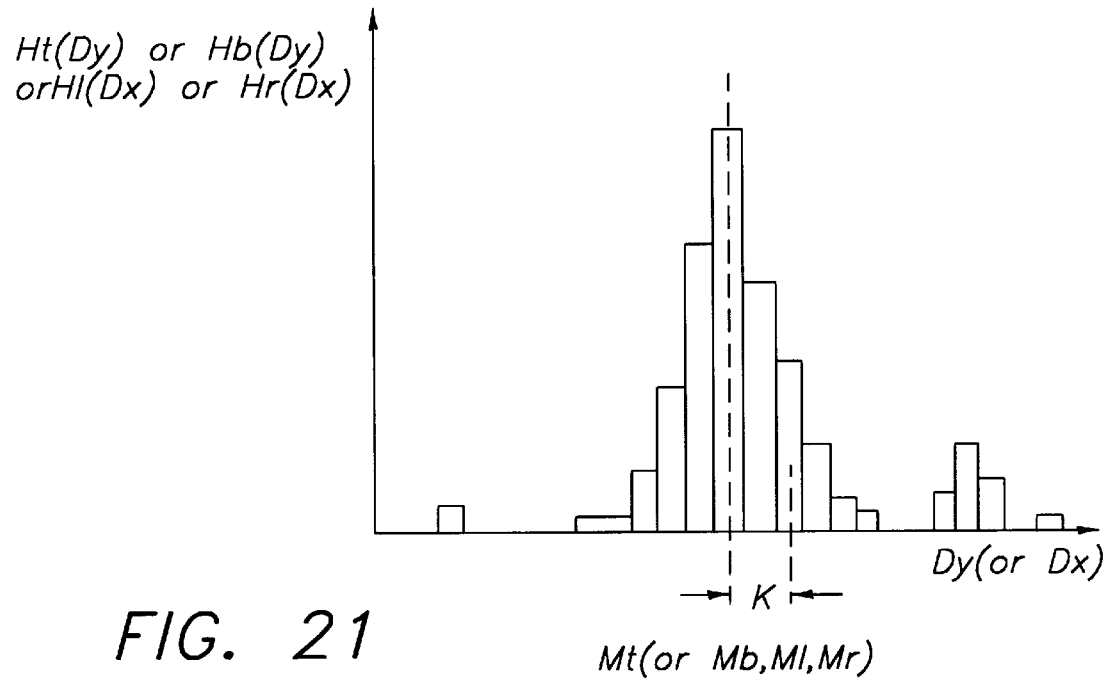
FIG. 21 is a histogram of vertical distance of adjacent intersection points.

Next, two histograms of the vertical distances of adjacent points, histogram (Ht (Dy)) of top intersection points and histogram (Hb (Dy)) of bottom intersection points, are calculated. The modes of the two histograms are labeled as Mt and Mb as shown in FIG. 21, respectively. To further refine the slope determination, points falling outside of the range of Mt+/−K values and Mb+/−K values are removed, respectively. After the data refining process, the correlation coefficients Ct and Cb of the remaining top intersection points and the remaining bottom intersection points are calculated for evaluating the collinearity of the points, respectively. The correlation coefficients are determined as follows. The points of intersection between these scan lines and the top or bottom line of the polygon are $(x_i, y_i)$ where $i=1, \ldots, N$, and N is the number of intersection points. The correlation coefficient ($r_{xy}$) is defined by $$r_{xy} = \frac{S_{xy}}{S_x S_y},$$

where $S_{xy} = \sum_{i=0}^{N} (x_i - \bar{x})(y_i - \bar{y})$ and $S_x = \sqrt{\sum_{i=1}^{N} (x_i - \bar{x})^2}$, $S_y = \sqrt{\sum_{i=1}^{N} (y_i - \bar{y})^2}$ The value of the correlation coefficient is between zero and one, according to the definition. If the correlation coefficient is close to one, it indicates that these points are collinear, and the linear least square fit is applied to these points. The rotating angle $\theta_S$ is read from the slope ($\theta_S$=b) of the fitted straight line, y=a+bx, where $$b = \frac{\sum_{i=1}^{N} x_i y_i - N\bar{x}\bar{y}}{\sum_{i=1}^{N} x_i^2 - N\bar{x}^2}, \bar{x} = \sum_{i=1}^{N} x_i, \bar{y} = \sum_{i=1}^{N} y_i.$$

The rotating angle of the polygon is taken as the skew angle of the scanned photographs.

Figure 22:
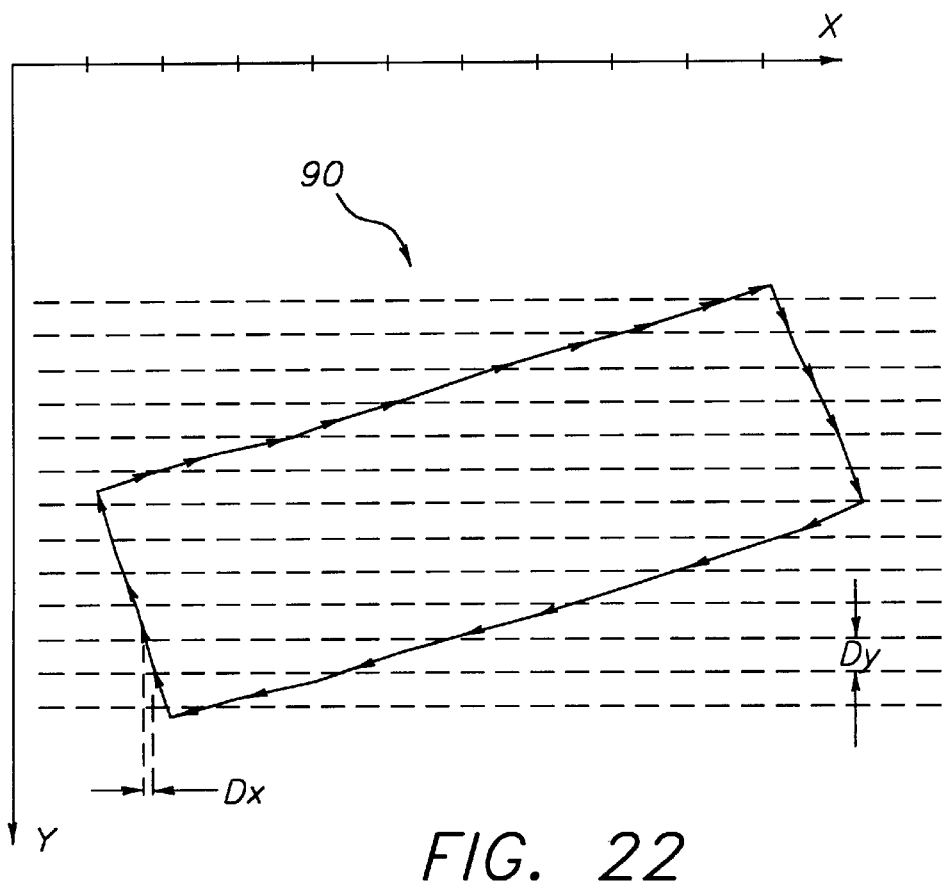
FIG. 22 is a diagram showing collection of left most intersection points and right most intersection points.

Since the shape of the photograph is assumed to be rectangular, the top border line and the bottom border line must be parallel. Hence, the evaluation of the collinearity of the points uses the greater value (Cm) of the two correlation coefficients, Ct and Cb, shown in FIG. 19 and 23. In case that the Cm is smaller than a predefined threshold (TH), it indicates that either the horizontal border or irregular border is detected. Under this condition, the skew angle is always set to zero. This means that top and bottom borders are set to be horizontal. The calculation of the left border and the right border lines is similar to the steps described above. The block diagram of the process is repeated for horizontal intersections, shown in FIG. 22, and calculations of the left border line and the right border line in FIG. 23.

After the origin point of the photograph (left-top corner) is determined, image dimensions (width and height) and skew angle of every detected photograph is calculated from the full platen low resolution scan. The image bounding coordinates as shown in FIG. 17 are readjusted (scaled up) and mapped into the coordinate of a desired high resolution scan.

A photograph of interest is selected and a high resolution scan of the selected photograph is made. After the high resolution scan the high resolution image is deskewed with a standard bilinear image interpolation as is well know in the art.

Figure 24:
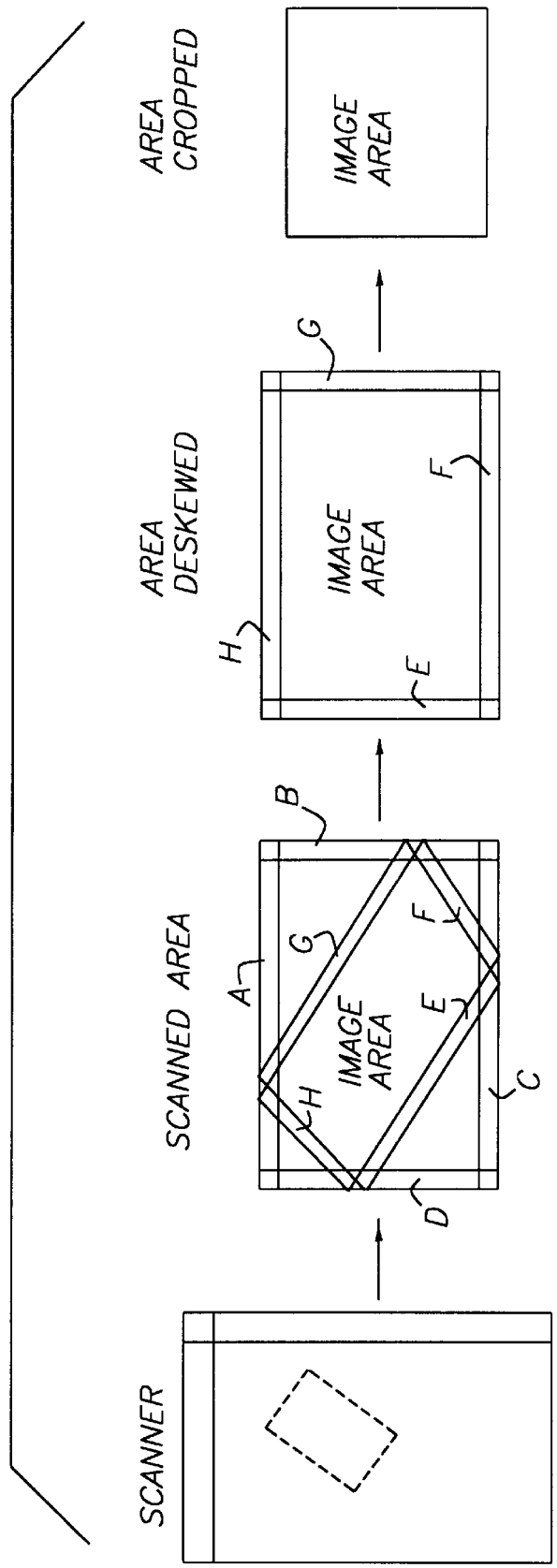
FIG. 24 is a flow diagram schematically depicting the deskew and cropping operation.

FIG. 24 shows schematically the deskewing and removal of artifacts by cropping the image area. After the image has been deskewed, top, bottom, and side edge artifacts can be easily removed. The image can then be stored to a disk as is well known in the art or printed as a photograph.

The invention has been described with reference to a preferred embodiment. However, it will be appreciated that variations and modifications can be effected by a person of ordinary skill in the art without departing from the scope of the invention.

We claim:

1. A method for scanning and detecting multiple photographs and removing edge artifacts comprising the steps of:

placing a plurality of photographs on a scanner;

performing a low resolution scan to produce a plurality of low resolution images;

constructing a plurality of polygons, each polygon containing at least one of said low resolution images;

determining a number of polygons;

comparing said number of polygons to a number equal to said plurality of photographs;

if the number of polygons is less than the number equal to said plurality of photographs, repositioning overlapped photographs and repeating said low resolution scan and subsequent steps;

determining a skew angle and a location of each of said plurality of photographs;

selecting a first photograph;

scanning said first photograph at a high resolution to produce a high resolution image;

deskewing said high resolution image; and cropping said high resolution image to remove said edge artifacts.

2. A method as in claim 1 wherein said low resolution images are converted to a binary images prior to constructing said plurality of polygons.

3. A method as in claim 1 wherein the number of polygons is determined by grouping smaller polygons which fall within a border of a larger polygon as single photographic polygon.

4. A method as in claim 1 wherein a location of said first photographs is determined prior to determining said skew angle.

5. A method as in claim 1 wherein a height, and a width are determined prior to determining said skew angle.

6. A method as in claim 1 wherein said cropped high resolution image is saved to a hard drive.

7. A method as in claim 1 wherein said cropped high resolution image is printed.

8. A method as in claim 1 wherein a second photograph is selected after said high resolution is cropped.

9. A method as in claim 1 wherein said images are displayed on a touch screen.

10. A method as in claim 9 wherein said photograph of interest is selected by touching said touch screen.

11. A method for scanning and detecting multiple photographs by constructing polygons from linear line segments that have been derived from an image formed from a scan of said photographs comprising the steps of:

detecting binary values of pixels from said image;

positioning each of said binary values into an assigned and ordered position forming a string of binary values for each image with each string of binary values forming an integer number;

directing the formed integer number to a look-up-table that translates each integer number into one or more output template commands;

joining linear line segments into at least one polygon in response to the one or more output template commands;

rotating said at least one polygon so that one edge of said polygon is parallel to a scanner platen glide;

cropping said image to remove edge artifacts;

determining a number of polygons;

comparing said number of polygons to a number equal to said multiple photographs; and if the number of polygons is less than the number equal to said multiple photographs, repositioning overlapped photographs and repeating said scan.

12. A method as in claim 11 wherein said number of polygons is determined by grouping smaller polygons which fall within a border of a larger polygon, as single photographic polygon.

* * * * *